US011530855B2

(12) United States Patent
Liu et al.

(10) Patent No.: US 11,530,855 B2
(45) Date of Patent: Dec. 20, 2022

(54) AIR CONDITIONER HEAT DISSIPATION STRUCTURE CONTROL METHOD AND SYSTEM

(71) Applicants: QINGDAO HAIER AIR-CONDITIONING ELECTRONIC CO., LTD., Qingdao (CN); HAIER SMART HOME CO., LTD., Qingdao (CN)

(72) Inventors: Yuhui Liu, Qingdao (CN); Shaojiang Cheng, Qingdao (CN); Xuefei He, Qingdao (CN); Wenbo Bai, Qingdao (CN); Yu Leng, Qingdao (CN)

(73) Assignees: QINGDAO HAIER AIR-CONDITIONING ELECTRONIC CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 209 days.

(21) Appl. No.: 16/966,693

(22) PCT Filed: Jan. 28, 2019

(86) PCT No.: PCT/CN2019/073368
§ 371 (c)(1),
(2) Date: Jul. 31, 2020

(87) PCT Pub. No.: WO2019/149167
PCT Pub. Date: Aug. 8, 2019

(65) Prior Publication Data
US 2021/0033321 A1    Feb. 4, 2021

(30) Foreign Application Priority Data
Jan. 31, 2018  (CN) .......................... 201810098748.8

(51) Int. Cl.
*F25B 41/31* (2021.01)
*F25B 41/20* (2021.01)
(Continued)

(52) U.S. Cl.
CPC .............. *F25B 41/31* (2021.01); *F25B 41/20* (2021.01); *F25B 41/40* (2021.01); *F25B 43/00* (2013.01);
(Continued)

(58) Field of Classification Search
CPC combination set(s) only.
See application file for complete search history.

(56) References Cited

FOREIGN PATENT DOCUMENTS

| CN | 102954555 | 3/2013 |
|---|---|---|
| CN | 103363730 | 10/2013 |

(Continued)

*Primary Examiner* — Kun Kai Ma
(74) *Attorney, Agent, or Firm* — Jiwen Chen; Joywin IP Law PLLC (57) ABSTRACT

An air conditioning heat dissipation structure control method and a system includes the steps obtaining a real-time temperature Te of the heat generating component; if $T_e > T_e^d$, opening the solenoid valve SV2 and adjusting the electronic expansion valve 4 to a preset initial opening degree; obtaining an update real-time temperature $T_e$ of the heat generating component after a setting time period; if the update real-time temperature $T_e > T_{max}$, performing the following steps every set period of time, obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe; calculating a real-time temperature difference $\Delta T_{real-time}$ of the inlet end temperature $T_{in}$ and the outlet end temperature $T_{out}$, wherein $\Delta T_{real-time} = T_{out} - T_{in}$, obtaining a preset target temperature difference $\Delta T_{target}$ and calculating a deviation $\Delta T_{deviation}$, $\Delta T_{deviation} = \Delta T_{real-time} - \Delta T_{target}$; calculating a deviation (Continued)

change rate $\Delta\Delta T_{deviation} = \Delta T_{deviation} - \Delta T_{deviation'}$, and adjusting the opening degree of the electronic expansion valve based on the deviation $\Delta T_{deviation}$ and the deviation change rate $\Delta\Delta T_{deviation}$, enables the temperature difference between the inlet end and the outlet end of the refrigerant heat dissipation pipe reaches the target temperature difference so as to ensure a good heat dissipation effect and keep the heat generating component working in a good condition and also lowers the cost by using refrigerant for transferring heat from the heat generating component. With the method, the reliability and stability of the air conditioning operation are improved, and the problem of poor heat dissipation reliability and high heat dissipation cost in the prior art is solved.

9 Claims, 4 Drawing Sheets

(51) Int. Cl.
*F25B 41/40* (2021.01)
*F25B 43/00* (2006.01)
*F25B 49/02* (2006.01)
*F25B 41/34* (2021.01)

(52) U.S. Cl.
CPC .............. *F25B 49/02* (2013.01); *F25B 41/34* (2021.01); *F25B 2400/23* (2013.01); *F25B 2600/2513* (2013.01); *F25B 2700/21* (2013.01)

(56) References Cited

FOREIGN PATENT DOCUMENTS

| | | | |
|---|---|---|---|
| CN | 104848438 | | 8/2015 |
| CN | 206207598 | | 5/2017 |
| CN | 109000392 A | * | 12/2018 |
| JP | H08189719 | | 7/1996 |
| JP | 2008057875 | | 3/2008 |

* cited by examiner

AIR CONDITIONER HEAT DISSIPATION STRUCTURE CONTROL METHOD AND SYSTEM

This is a U.S. national stage application of PCT Application No. PCT/CN2019/073368 under 35 U.S.C. 371, filed Jan. 28, 2019 in Chinese, claiming priority of Chinese Application No. 201810098748.8, filed Jan. 31, 2018, all of which are hereby incorporated by reference.

TECHNOLOGY FIELD

The invention belongs to the technical field of air conditioning, and in particular relates to a method for controlling a heat dissipation structure of an air conditioner and a system for accomplishing the same.

BACKGROUND TECHNOLOGY

Variable-speed air conditioners are widely used on the market due to their advantages of intelligence, high efficiency, low noise and quick adjustment of temperature. A variable speed air conditioner is provided with a control system and an inverter that enable a compressor therein to operate at several different speeds while running, thereby allowing the unit to run at the speed that best meets comfort needs. Some power components disposed within the inverter or in a control box where the main circuit board is installed are prone to overheating while working. If heat dissipation from those components in such a closed enclosure fails, the running of the compressor will probably be affected, and even over-temperature protection could be triggered to shut down the power supply of the compressor, and the rising temperatures also cause damages to the circuit components. Hence, the heat dissipation design for those power components is important.

Two different thermal dissipation forms are typically used in a variable speed air conditioner for those power components: the first one is passive cooling which refers to the use of ventilation, such as horizontal slats formed onto the surface of the electric control box, to remove heat by the physical properties of air; and the second one is forced convection which generates an air flow by a cooling fan. However, the passive cooling has shortcomings in dust and water resistance so it is far from meeting the heat dissipation requirements of high power components; while in fact the cooling fan performs badly on heat dissipation effect and further has a limited service life which is shorter than that of the power components; once the cooling fan fails, it will damage the working stability of the inverter; but the improvement of the cooling fan may increase the cost of the product.

SUMMARY OF THE INVENTION

One aspect of the present invention is to provide a method for controlling a heat dissipation structure of an air conditioner for solving the problems of poor heat dissipation reliability and high heat dissipation cost in the prior art.

In order to solve the above technical problems, the present invention is implemented by the following technical solutions:

A method for controlling a heat dissipation structure of an air conditioner characterized in that: the heat dissipation structure comprising: a refrigerant heat dissipation pipe with an inlet end connected to a liquid pipe between an outdoor heat exchanger and an indoor heat exchanger and an outlet end connected to an inlet pipe of the gas-liquid separator, which is fixed with a heat generating component; and an electronic expansion valve connected in series to the refrigerant heat dissipation pipe;

the method comprises:

obtaining a real-time temperature $T_e$ of the heat generating component, determining whether the real-time temperature $T_e$>a preset optimal temperature $T_e^d$;

if $T_e$>$T_e^d$, adjusting the electronic expansion valve 4 to a preset initial opening degree;

obtaining an update real-time temperature $T_e$ of the heat generating component after a preset time period;

determining whether or not the update real-time temperature $T_e$>a preset upper limit value $T_{max}$;

wherein $T_{max}$>$T_e^d$;

if the update real-time temperature $T_e$>$T_{max}$ performing following steps every set period of time:

(1) obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe;

(2) calculating a real-time temperature difference $\Delta T_{real-time}$ of the inlet end temperature $T_{in}$ and the outlet end temperature $T_{out}$, wherein $\Delta T_{real-time}=T_{out}-T_{in}$;

(3) obtaining a preset target temperature difference $\Delta T_{target}$ and calculating a deviation $\Delta T_{deviation}$, $\Delta T_{deviation}=\Delta T_{real-time}-\Delta T_{target}$;

(4) calculating a deviation change rate $\Delta\Delta T_{deviation}=\Delta T_{deviation}-\Delta T_{deviation'}$; wherein the $\Delta T_{deviation'}$ is the deviation calculated last time;

(5) adjusting the opening degree of the electronic expansion valve based on the deviation $\Delta T_{deviation}$ and the deviation change rate $\Delta\Delta T_{deviation}$.

Further, in step (3), it further includes: obtaining a correction value according to the current real-time temperature $T_e$ of the heat generating component after obtaining the preset target temperature difference $\Delta T_{target}$; correcting the preset target temperature difference $\Delta T_{target}$, wherein the corrected target temperature difference=the preset target temperature difference $\Delta T_{target}$+the correction value; and calculating a deviation $\Delta T_{deviation}$ based on the corrected target temperature difference, wherein $\Delta T_{deviation}=\Delta T_{real-time}-(\Delta T_{target}+$the correction value).

Further, the larger the real-time temperature $T_e$ of the heat generating component, the smaller the correction value, and when $T_e \geq$ a second set temperature, the correction value is <0;

when a first set temperature$\leq T_e<$the second set temperature, the correction value=0;

when $T_e<$the first set temperature, the correction value is >0.

Further, when 90° C.$\leq T_e<$100° C., the correction value is −3° C.; when 80° C.$\leq T_e<$90° C., the correction value is −2° C.; when 70° C.$\leq T_e<$80° C., the correction value is −1° C.; when 60° C.$\leq T_e<$70° C., the correction value is 0; when 50° C.$\leq T_e<$60° C., the correction value is 1° C.; when 40° C.$\leq T_e<$50° C., the correction value is 2° C.

Further, adjusting the opening degree of the electronic expansion valve based on the deviation $\Delta T_{deviation}$ and the deviation change rate $\Delta\Delta T_{deviation}$ includes:

(1) when the $\Delta T_{deviation}<0$ and the $\Delta\Delta T_{deviation}<0$, reducing the opening degree of the electronic expansion valve;

(2) when the $\Delta T_{deviation}=0$ and the $\Delta\Delta T_{deviation}=0$, keeping the opening degree of the electronic expansion valve unchanged;

(3) when the $\Delta T_{deviation}$>0, and the $\Delta\Delta T_{deviation}$>0, increasing the opening degree of the electronic expansion valve;

(4) when the $\Delta T_{deviation}$<0 and the $\Delta\Delta T_{deviation}$>0:

if $-2°$ C.<$\Delta T_{deviation}$<0° C., increasing the opening degree of the electronic expansion valve;

if $\Delta T_{deviation}$≤$-2°$ C., reducing the opening degree of the electronic expansion valve 4;

(5) when the $\Delta T_{deviation}$>0 and the $\Delta\Delta T_{deviation}$ is <0:

if 0° C.<$\Delta T_{deviation}$≤3° C. and $\Delta\Delta T_{deviation}$≤$-2°$ C., reducing the opening degree of the electronic expansion valve;

if 0° C.<$\Delta T_{deviation}$≤3° C. and $-2°$ C.<$\Delta\Delta T_{deviation}$<0° C., increasing the opening degree of the electronic expansion valve; and if the $\Delta T_{deviation}$>3° C., increasing the opening degree of the electronic expansion valve.

Preferably, $T_{max}=T_e^d+5°$ C.

Preferably, the initial opening degree of the electronic expansion valve is in a range from 40% to 60% of a full opening degree.

Further, a solenoid valve SV2 is connected in series to the refrigerant heat dissipation pipe to close or open it.

Further, the refrigerant heat dissipation pipe is fixed to the heat generating component through a heat dissipation substrate, a thermal medium is coated on a contact surface between the heat dissipation substrate and the refrigerant heat dissipation pipe, and a thermal medium is also coated on a contact surface of the heat dissipation substrate and the heat generating component.

Another aspect of the present invention is to provide a system for controlling a heat dissipation structure of an air conditioner, the heat dissipation structure including a refrigerant heat dissipation pipe and a heat dissipation substrate; wherein the heat generating component is fixed to the heat dissipation substrate and the refrigerant heat dissipation pipe is embedded in the heat dissipation substrate; on a contact surface of the heat dissipation substrate and the refrigerant heat dissipation pipe, a thermal medium is coated, and a thermal medium is also applied to a contact surface of the heat dissipation substrate 1 and the heat generating component; the inlet end of the refrigerant heat dissipation pipe is connected to the liquid pipe between the outdoor heat exchanger and the indoor heat exchanger, and the outlet end of the refrigerant heat dissipation pipe is connected to the liquid inlet pipe of the gas-liquid separator; the refrigerant heat dissipation pipe is provided with an electronic expansion valve and a solenoid valve SV2 connected with each other in series;

the control system includes:

a heat generating component temperature acquisition module configured to obtain a real-time temperature $T_e$ of the heat generating component;

a determination module configured to determine whether the real-time temperature $T_e$>a preset optimal temperature $T_e^d$;

a refrigerant temperature obtaining module configured to obtain a refrigerant temperature $T_{in}$ at an inlet end of the refrigerant heat dissipation pipe and a refrigerant temperature $T_{out}$ at the outlet end of the refrigerant heat dissipation pipe;

a temperature difference calculation module configured to calculate a temperature difference $\Delta T_{real-time}$, $\Delta T_{real-time}=T_{out}-T_{in}$;

a correction module configured to determine a correction value according to the real-time temperature $T_e$ of the heat generating component and to correct a target temperature difference $\Delta T_{target}$;

a deviation calculation module configured to calculate a deviation $\Delta T_{deviation}=\Delta T_{real-time}-\Delta T_{target}$;

a deviation change rate calculation module configured to calculate a deviation change rate $\Delta\Delta T_{deviation}=\Delta T_{deviation}-\Delta T_{deviation'}$; wherein $\Delta T_{deviation'}$ is the deviation calculated last time; and an opening adjustment module configured to adjust the opening of the electronic expansion valve to an initial opening degree and configured to adjust the opening degree of the electronic expansion valve according to the deviation $\Delta T_{deviation}$ and the deviation change rate $\Delta\Delta T_{deviation}$.

Compared with the prior art, the advantages and positive effects of the present invention are: the air conditioning heat dissipation structure control method and system of the present invention, which include the steps obtaining a real-time temperature Te of the heat generating component; if $T_e$>$T_e^d$, opening the solenoid valve SV2 and adjusting the electronic expansion valve 4 to a preset initial opening degree; obtaining an update real-time temperature $T_e$ of the heat generating component after a setting time period; if the update real-time temperature $T_e$>$T_{max}$, performing the following steps every set period of time, obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe; calculating a real-time temperature difference $\Delta T_{real-time}$ of the inlet end temperature $T_{in}$ and the outlet end temperature $T_{out}$, wherein $\Delta T_{real-time}=T_{out}-T_{in}$, obtaining a preset target temperature difference $\Delta T_{target}$ and calculating a deviation $\Delta T_{deviation}$, $\Delta T_{deviation}=\Delta T_{real-time}-\Delta T_{target}$; calculating a deviation change rate $\Delta\Delta T_{deviation}=\Delta T_{deviation}-\Delta T_{deviation'}$, and adjusting the opening degree of the electronic expansion valve based on the deviation $\Delta T_{deviation}$ and the deviation change rate $\Delta\Delta T_{deviation}$, enables the temperature difference between the inlet end and the outlet end of the refrigerant heat dissipation pipe reaches the target temperature difference so as to ensure a good heat dissipation effect and keep the heat generating component working in a good condition and also lowers the cost by using refrigerant for transferring heat from the heat generating component. With the method, the reliability and stability of the air conditioning operation are improved, and the problem of poor heat dissipation reliability and high heat dissipation cost in the prior art is solved.

Advantages and features of the present disclosure will be more clearly understood from exemplary embodiments described below with reference to the accompanying drawings.

PART NUMBERS

1—Thermal Substrate; 2—Refrigerant Heat Dissipation Pipe; 3—Heat Generating Component(s); 4—Electronic Expansion Valve;

11—Outdoor Heat Exchanger; 12—Indoor Heat Exchanger; 13—Drying Filter; 14—Electronic Expansion Valve; 15—Check Valve; 16—Check Valve; 17—Check Valve.

DETAILED DESCRIPTION OF THE EMBODIMENTS

The present invention will be further described in detail below with reference to the accompanying drawings and embodiments.

According to the invention a method for controlling a heat dissipation structure of an air conditioner and a system for accomplishing the same are disclosed aiming for improving heat dissipation reliability and reducing its cost in the prior art, and further to enable an air conditioner to run at a stable state.

Figure 4:
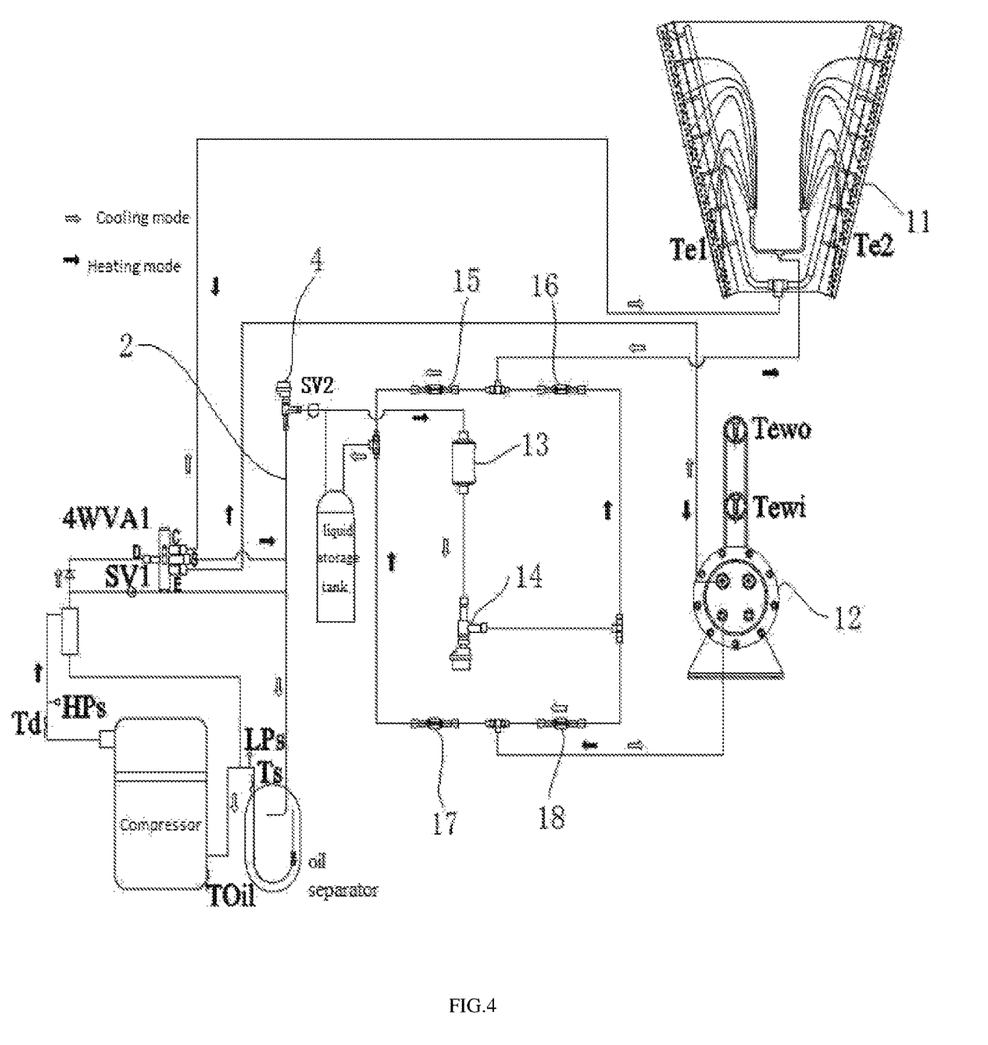
FIG. 4 is a schematic view showing a refrigerant circuit of an air conditioner connected to the heat dissipation structure shown in FIG. 2.

The structure of an air conditioner is shown in FIG. 4.

In cooling mode, a refrigerant flow path of the air conditioner is: a compressor→an oil separator→a four-way valve (through a D-C channel)→an outdoor heat exchanger 11 (a fin-type condenser)→a check valve 15→a liquid storage tank→a drying filter 13→an electronic expansion valve 14→a check valve 18→an indoor heat exchanger 12 (a dry-type evaporator)→the four-way valve (through a E-S channel)→a gas-liquid separator→the compressor.

In heating mode, a refrigerant flow path of the air conditioner is: the compressor→the oil separator→the four-way valve (through a D-E channel)→the indoor heat exchanger 12 (a dry-type evaporator)→a check valve 17→the liquid storage tank→the drying filter 13→the electronic expansion valve 14→a check valve 16→the outdoor heat exchanger 11 (a fin condenser)→the four-way valve (through a C-S channel)→the gas-liquid separator→the compressor.

Figure 2:
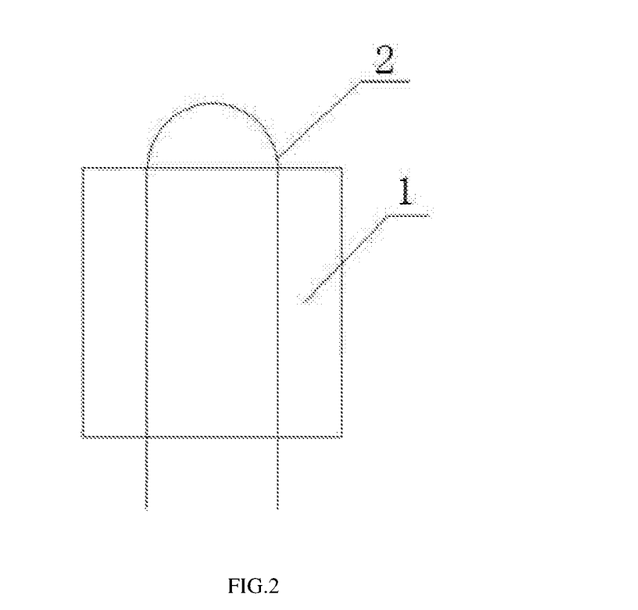
FIG. 2 is a front view of a heat dissipation structure.
Figure 3:
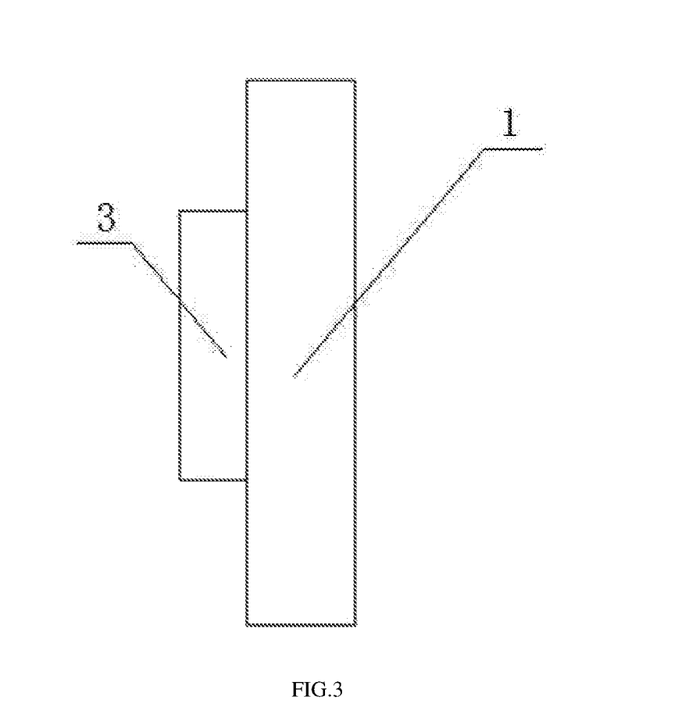
FIG. 3 is a left side view of FIG. 2.

The heat dissipation structure provided by the present invention mainly comprises a refrigerant heat dissipation pipe 2. The refrigerant heat dissipation pipe 2 is fixed with a heat generating component 3, the inlet end of the refrigerant heat dissipation pipe 2 is connected to a liquid pipe between the outdoor heat exchanger and the indoor heat exchanger and the outlet end of the refrigerant heat dissipation pipe 2 is connected to an inlet pipe of the gas-liquid separator. An electronic expansion valve 4 is connected in series to the refrigerant heat dissipation pipe 2 for adjusting the flow rate of the refrigerant in the refrigerant heat dissipation pipe 2, as shown in FIG. 2 to FIG. 4.

The inlet end of the refrigerant heat dissipation pipe 2 is specifically connected to an outlet end of the liquid storage tank, specifically to a portion of the refrigerant circulation before the electronic expansion valve 14 where the flow of refrigerant is not being controlled by the electronic expansion valve 14. Four check valves (15, 16, 17, and 18) are provided to maintain the refrigerant temperature in the refrigerant heat dissipation pipe 2 within a certain range in both cooling mode and heating mode.

The refrigerant flowing out from the liquid storage tank is divided into two paths: in one path, the refrigerant flows to the drying filter 13 and the electronic expansion valve 14 to enter into a cooling cycle or a heating cycle of air conditioning, while in the other path, the refrigerant enters into the refrigerant heat dissipation pipe 2 to exchange heat with a heat generating component 3 and lower its temperature, and then flowing into the gas-liquid separator and the compressor sequentially.

Those electronic components which could generate heat in an electric control box of the air conditioner could be regarded as a heat generating component, such as a frequency converter. The heat generated could be transferred to the refrigerant heat dissipation pipe 2 by heat conduction.

Because some types of electronic expansion valves could not completely shut off the pipeline, a solenoid valve SV2 is also connected in series to the refrigerant heat dissipation pipe 2 so as to close or open it.

In order to achieve a rapid on-off and flow rate control of the refrigerant heat dissipation pipe 2, and also to avoid wasting the capacity of refrigerant or affect the cooling cycle or heating cycle of air conditioning, the solenoid valve SV2 and the electronic expansion valve 4 are connected in series at the inlet end of the refrigerant heat dissipation pipe 2.

In the present embodiment, the refrigerant heat dissipation pipe 2 is fixed to the heat generating component 3 through a heat dissipation substrate 1 to facilitate the fixing of the refrigerant heat dissipation pipe 2 and the heat generating component 3. The heat generating component 3 is fixedly connected to the thermal substrate 1 by bolts and the refrigerant heat dissipation pipe 2 is embedded in the thermal substrate 1. A thermal medium is coated on a contact surface between the heat dissipation substrate 1 and the refrigerant heat dissipation pipe 2, and a thermal medium is also coated on a contact surface of the heat dissipation substrate 1 and the heat generating component 3 to facilitate heat conduction and accelerate heat dissipation. The thermal medium could be silica gel which is good in thermal conductivity.

The heat generated by the heat generating component 3 is transferred to the thermal substrate 1 and the thermal substrate 1 exchanges heat with the refrigerant in the refrigerant heat dissipation pipe 2. Hence, the heat generated by the heat generating component 3 is transferred to the refrigerant system by heat conduction to lower temperature of the heat generating component 3. The heat conduction path of the heat generating component is: the heat generating component 3→the thermal substrate 1→the refrigerant heat dissipation pipe 2.

Figure 1:
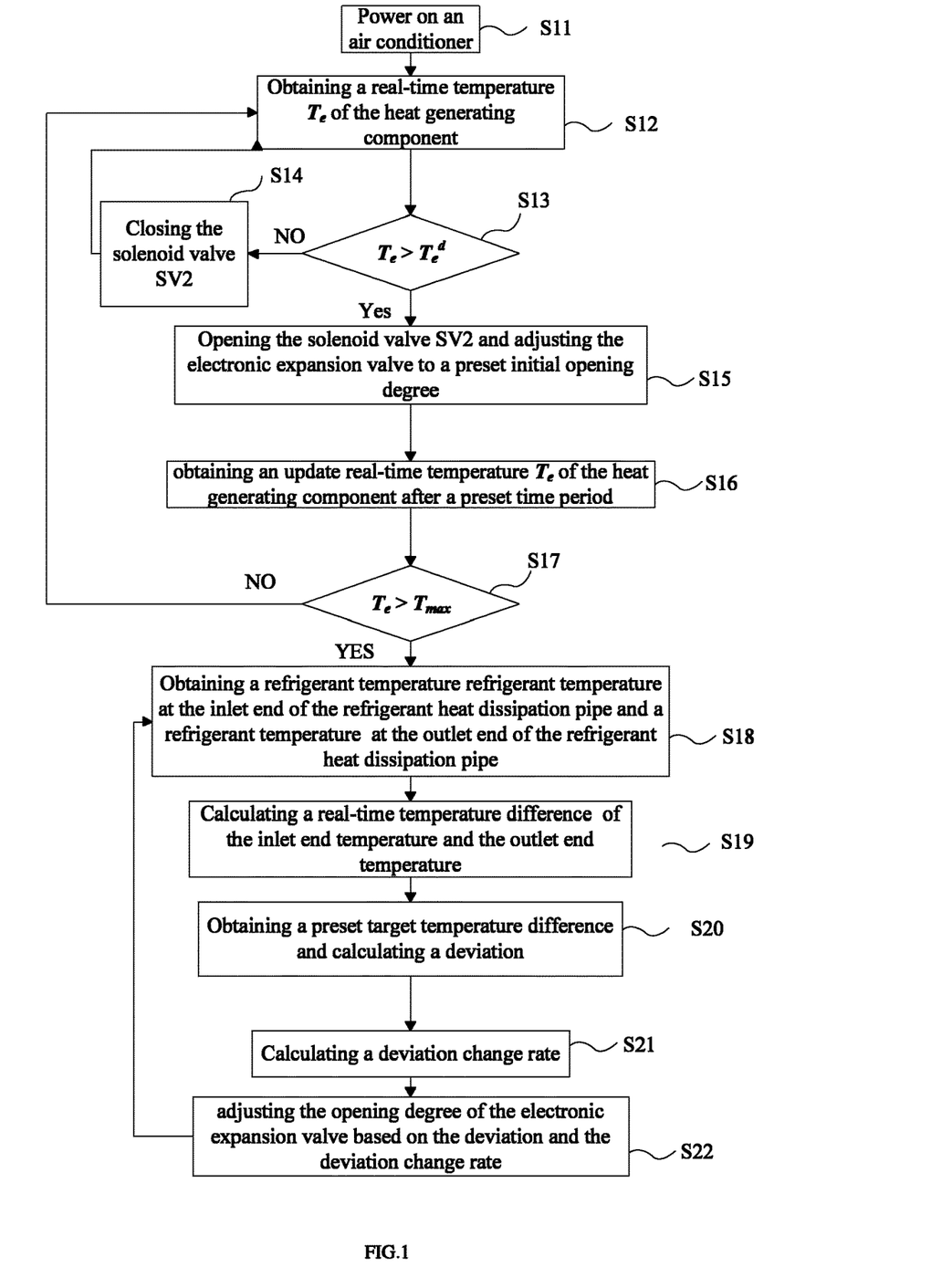
FIG. 1 is a method for controlling a heat dissipation structure of an air conditioner according to an embodiment of the present invention.

FIG. 1 shows a method for controlling the heat dissipation structure according to an embodiment of the present invention, which includes:

Step S11: The air conditioner is powered on.

Step S12: Obtaining a real-time temperature $T_e$ of the heat generating component.

Step S13: Determining whether $T_e$>a preset optimal temperature $T_e^d$.

If $T_e \leq T_e^d$, performing Step S14 because the temperature of the heat generating component is low and there is no need to use the refrigerant in the refrigerant heat dissipation pipe to lower its temperature.

If $T_e > T_e^d$, performing Step S15 because the temperature of the heat generating component is high and it requires using the refrigerant in the refrigerant heat dissipation pipe to lower its temperature.

Step S14: Closing the solenoid valve SV2 and the electronic expansion valve 4, and returning to Step S12.

After the solenoid valve SV2 and the electronic expansion valve 4 are closed, the refrigerant from the liquid storage tank could be prevented from entering into the refrigerant heat dissipation pipe 2.

Step S15: Opening the solenoid valve SV2 and adjusting the electronic expansion valve 4 to a preset initial opening degree.

When the solenoid valve SV2 is opened and the electronic expansion valve 4 is adjusted to the initial opening degree, the refrigerant flows into the refrigerant heat dissipation pipe, the gas-liquid separator, and the compressor sequentially. The refrigerant flowing in the refrigerant heat dissipation pipe exchanges heat with the heat generating component to cool the heat generating component.

In the present embodiment, the initial opening degree of the electronic expansion valve 4 could be set in a range from 40% to 60% of the full opening degree. This range could avoid the rate of refrigerant flowing into the refrigerant heat dissipation pipe too small to worsen dissipation effect or too large to affect the refrigerant cycle of air conditioning, especially if it is too large it may further lead to a narrow adjustable range in Step S22 as follows. Preferably, the initial opening degree is set to 50% of the full opening degree and it is an optimum value that not only achieves an ideal heat dissipation effect, but also avoids affecting the refrigerant cycle.

For example, if the electronic expansion valve 4 has a full opening degree of 1400 steps, the initial opening degree could be set in a range from 560 steps to 840 steps. Preferably, the initial opening is set to 700 steps.

Step S16: obtaining an update real-time temperature $T_e$ of the heat generating component after a preset time period.

When the electronic expansion valve 4 is opened to the initial opening degree, it requires evaluating heat dissipation effect on the heat generating component after exchanging heat with the refrigerant in the refrigerant heat dissipation pipe, and therefore, it requires obtaining an update real-time temperature of the heat generating component.

Step S17: determining whether or not the update real-time temperature $T_e > $ a preset upper limit value $T_{max}$; wherein $T_{max} > T_e^d$.

If the update real-time temperature $T_e \leq T_{max}$, it suggests that the real-time temperature of the heat generating component is still within an acceptable range and the initial opening degree of the electronic expansion valve 4 could satisfy current heat dissipation requirement, and there is no need to adjust the opening degree of the electronic expansion valve 4; returning to Step S12.

If the update real-time temperature $T_e > T_{max}$, it suggests that the heat generating component may overheat and the initial opening degree of the electronic expansion valve 4 could not satisfy current heat dissipation requirement, it requires adjusting the opening degree of the electronic expansion valve 4; performing Step S18 to Step S22 every set period of time.

In the present embodiment, $T_{max} = T_e^d + 5°$ C. it suggests that the upper limit value $T_{max}$ is 5° C. above the preset optimal temperature $T_e^d$. On the contrary, if the value $T_{max}$ is set too small, the update real-time temperature $T_e$ may frequently be greater than $T_{max}$, the process may enter into Step S18 to Step S22 often to be cumbersome; if the value $T_{max}$ is set too large, the real-time temperature $T_e$ is probably less than $T_{max}$, the electronic expansion valve may not be timely adjusted even the heat generating component being overheated, the heat generating component may work in a overheated environment and burn out. $T_{max} = T_e^d + 5°$ C. is a reasonable value that not only ensures that the opening degree of the electronic expansion valve 4 could be timely adjusted when the heat generating component overheats, but also keeps the control process simple by avoiding entering into Step S18 to Step S22 frequently.

If the initial opening degree of the electronic expansion valve 4 could not satisfy current heat dissipation requirement, performing Step 18 to Step 22 every set period of time, for example the set period of time could be 10 minutes.

Step S18: Obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe.

Step S19: Calculating a real-time temperature difference $\Delta T_{real-time}$ of the inlet end temperature $T_{in}$ and the outlet end temperature $T_{out}$, wherein $\Delta T_{real-time} = T_{out} - T_{in}$.

Step S20: Obtaining a preset target temperature difference $\Delta T_{target}$ and calculating a deviation $\Delta T_{deviation}$, $\Delta T_{deviation} = \Delta T_{real-time} - \Delta T_{target}$.

In the present embodiment, in order to make the target temperature difference more accurate, it is necessary to correct the preset target temperature difference at first.

In this step, after obtaining the preset target temperature difference $\Delta T_{target}$, firstly obtaining a correction value according to the current real-time temperature $T_e$ of the heat generating component, then correcting the preset target temperature difference $\Delta T_{target}$, wherein the corrected target temperature difference=the preset target temperature difference $\Delta T_{target}$+the correction value, and then calculating a deviation $\Delta T_{deviation}$ based on the corrected target temperature difference, wherein $\Delta T_{deviation} = \Delta T_{real-time} - (\Delta T_{target} + $ the correction value); then recording and saving the $\Delta T_{deviation}$.

The correction of the target temperature difference according to the current real-time temperature $T_e$ enables the target temperature difference to be more accurate.

In the present embodiment, it preferably sets that the larger the real-time temperature $T_e$ of the heat generating component, the smaller the correction value, and (1) When $T_e \geq$ a second set temperature (for example, 70° C.), since the current temperature of the heat generating component is very high, it is necessary to lower the preset target temperature difference, and therefore, the correction value is <0.

(2) When a first set temperature$\leq T_e <$the second set temperature, there is no need to change the preset target temperature difference, and therefore, the correction value=0.

(3) When $T_e <$ the first set temperature (for example, 60° C.), since the actual temperature of the heat generating component is comparatively low, it is preferable to increase the preset target temperature difference, and therefore, the correction value is >0.

The correction value is determined according to the current real-time temperature $T_e$ of the heat generating component, and specifically includes:

a, when 90° C.$\leq T_e <$100° C., the correction value is −3° C.; the corrected target temperature difference=$\Delta T_{target}$−3° C.;

b, when 80° C.$\leq T_e <$90° C., the correction value is −2° C.; the corrected target temperature difference=$\Delta T_{target}$−2° C.;

c, when 70° C.$\leq T_e <$80° C., the correction value is −1° C.; the corrected target temperature difference=$\Delta T_{target}$−1° C.;

d, when 60° C.$\leq T_e <$70° C., the correction value is 0; the corrected target temperature difference=$\Delta T_{target}$;

e, when 50° C.$\leq T_e <$60° C., the correction value is 1° C.; the corrected target temperature difference=$\Delta T_{target}$+1° C.;

f, when 40° C.$\leq T_e <$50° C., the correction value is 2° C.; the corrected target temperature difference=$\Delta T_{target}$+2° C.

The above-mentioned correction of the preset target temperature difference according to the real-time temperature $T_e$ of the heat generating component can obtain a more accurate target temperature difference, thereby obtaining a more accurate deviation, thereby improving the accuracy of the opening adjustment of the electronic expansion valve 4.

Step S21: Calculating a deviation change rate $\Delta\Delta T_{deviation} = \Delta T_{deviation} - \Delta T_{deviation'}$.

The deviation change rate indicates the variation of $\Delta T_{deviation}$, such as rising, declining, or constant.

Wherein the $\Delta T_{deviation'}$ is the deviation calculated last time.

Step S22: adjusting the opening degree of the electronic expansion valve based on the deviation $\Delta T_{deviation}$ and the deviation change rate $\Delta\Delta T_{deviation}$.

The adjustment of the opening degree of the electronic expansion valve 4 according to the deviation and the deviation change rate could further regulate the flow rate of the refrigerant flowing into the refrigerant heat dissipation pipe, thereby ensuring that the flow rate of the refrigerant is enough to exchange heat with the heat generating component to cool it and achieve better heat dissipation effect.

The method for controlling a heat dissipation structure of an air conditioner disclosed by the present embodiment, which includes the steps obtaining a real-time temperature Te of the heat generating component; if $T_e > T_e^d$, opening the solenoid valve SV2 and adjusting the electronic expansion valve 4 to a preset initial opening degree; obtaining an update real-time temperature $T_e$ of the heat generating component after a setting time period; if the update real-time temperature $T_e > T_{max}$, performing the following steps every set period of time, obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe; calculating a real-time temperature difference $\Delta T_{real-time}$ of the inlet end temperature $T_{in}$ and the outlet end temperature $T_{out}$, wherein $\Delta T_{real-time} = T_{out} - T_{in}$, obtaining a preset target temperature difference $\Delta T_{target}$ and calculating a deviation $\Delta T_{deviation}$, $\Delta T_{deviation} = \Delta T_{real-time} - \Delta T_{target}$, calculating a deviation change rate $\Delta\Delta T_{deviation} = \Delta T_{deviation} - \Delta T_{deviation'}$, and adjusting the opening degree of the electronic expansion valve based on the deviation $\Delta T_{deviation}$ and the deviation change rate $\Delta\Delta T_{deviation}$, enables the temperature difference between the inlet end and the outlet end of the refrigerant heat dissipation pipe reaches the target temperature difference so as to ensure a good heat dissipation effect and keep the heat generating component working in a good condition and also lowers the cost by using refrigerant for transferring heat from the heat generating component. With the method, the reliability and stability of the air conditioning operation are improved, and the problem of poor heat dissipation reliability and high heat dissipation cost in the prior art is solved.

In the method for controlling a heat dissipation structure of an air conditioner disclosed by the present embodiment, the adjustment of the opening degree of the electronic expansion valve 4 is based on the deviation so that the temperature difference between the outlet end and the inlet end of the refrigerant heat dissipation pipe could reach the target temperature difference, thereby allowing heat from the heat generating component to be dissipated efficiently; the adjustment of the opening degree of the electronic expansion valve 4 is also based on the deviation change rate, namely taking into the variation trend of the deviation, so as to avoid frequent adjustments of the opening degree of the electronic expansion valve 4 and severe fluctuations of refrigerant flow rate that may affect normal cooling cycle or heating cycle. Therefore the stability of air conditioner is improved.

In the method for controlling a heat dissipation structure of an air conditioner disclosed by the present embodiment, heat from the heat generating component is transferred to the refrigerant and then transferred to the outside through it, thereby obtaining advantages of being energy-saving, reliable and low in cost. The operation of the heat generating component is ensured.

Adjusting the opening degree of the electronic expansion valve 4 according to the deviation $\Delta T_{deviation}$ and the deviation change rate $\Delta\Delta T_{deviation}$, specifically includes:

(1) When the $\Delta T_{deviation} < 0$ and the $\Delta\Delta T_{deviation} < 0$, namely the refrigerant temperature difference between the outlet end and the inlet end of the refrigerant heat dissipation pipe is less than the target temperature difference, it suggests that the temperature of the heat generating component is too low and the deviation is decreasing; the amount of refrigerant in the refrigerant heat dissipation pipe is superfluous and it requires reducing the opening degree of the electronic expansion valve 4.

(2) When the $\Delta T_{deviation} = 0$ and the $\Delta\Delta T_{deviation} = 0$, namely the refrigerant temperature difference between the outlet end and the inlet end of the refrigerant heat dissipation pipe is equal to the target temperature difference, it suggests that the temperature of the heat generating component is that of desired while the deviation is stable and remains unchanged; the amount of refrigerant in the refrigerant heat dissipation pipe is expected and it requires keeping the opening degree of the electronic expansion valve 4 unchanged.

(3) When the $\Delta T_{deviation} > 0$, and the $\Delta\Delta T_{deviation} > 0$, namely the refrigerant temperature difference between the outlet end and the inlet end of the refrigerant heat dissipation pipe is greater than the target temperature difference, it suggest that the temperature of the heat generating component is too high and the deviation is increasing; the amount of refrigerant in the refrigerant heat dissipation pipe is insufficient and it requires increasing the opening degree of the electronic expansion valve 4.

(4) When the $\Delta T_{deviation} < 0$ and the $\Delta\Delta T_{deviation} > 0$, namely the refrigerant temperature difference between the outlet end and the inlet end of the refrigerant heat dissipation pipe is less than the target temperature difference, it suggests that the temperature of the heat generating component is too low but the deviation is increasing.

If $-2°$ C. $< \Delta T_{deviation} < 0°$ C., it requires increasing the opening degree of the electronic expansion valve 4 because the difference between the refrigerant temperature difference and the target temperature difference is comparatively small and the deviation is still increasing although the refrigerant temperature difference < the target temperature difference.

If the $\Delta T_{deviation} \leq -2°$ C., it requires reducing the opening degree of the electronic expansion valve 4 because the difference between the refrigerant temperature difference and the target temperature difference is comparatively large although the deviation is still increasing.

(5) When the $\Delta T_{deviation} > 0$ and the $\Delta\Delta T_{deviation}$ is $< 0$, namely the refrigerant temperature difference between the outlet end and inlet end of the refrigerant heat dissipation pipe is greater than the target temperature difference, it suggests that the temperature of the heat generating component is comparatively high but the deviation is decreasing.

If $0°$ C. $< \Delta T_{deviation} \leq 3°$ C. and $\Delta\Delta T_{deviation} \leq -2°$ C., namely the refrigerant temperature difference > the target temperature difference, it requires reducing the opening degree of the electronic expansion valve 4 because the temperature difference between the refrigerant temperature difference and the target temperature difference is comparatively small and the deviation is reduced significantly although the refrigerant temperature difference > the target temperature difference.

If $0°$ C. $< \Delta T_{deviation} < 3°$ C. and $-2°$ C. $< \Delta\Delta T_{deviation} < 0°$ C., namely the refrigerant temperature difference > the target temperature difference, it requires increasing the opening degree of the electronic expansion valve 4 because the deviation is not significantly reduced.

If the $\Delta T_{deviation} > 3°$ C., namely the refrigerant temperature difference > the target temperature difference, it requires increasing the opening degree of the electronic expansion valve 4 because the temperature difference between the refrigerant temperature difference and the target temperature difference is comparatively large.

In the method for controlling a heat dissipation structure of an air conditioner disclosed by the present embodiment, the opening degree of the electronic expansion valve 4 is increased or decreased according to the specific value range of the deviation and the deviation change rate so that the temperature difference between the outlet end and the inlet end of the refrigerant heat dissipation pipe reaches to the target temperature differences. It ensures heat dissipation effect and avoids frequent adjustment of the opening degree of the electronic expansion valve 4 which may affect running stability.

In the following table, taking the electronic expansion valve 4 full opening degree as 1400 steps as an example, the number of steps in which the opening degree of the electronic expansion valve 4 is increased or decreased when the deviation and the variation rate of the deviation take different values are exemplified.

| $\Delta T_{deviation}$ | $\Delta\Delta T_{deviation}$ | | | | | | |
|---|---|---|---|---|---|---|---|
| | ≤−3 | =−2 | =−1 | =0 | =1 | =2 | ≥3 |
| ≤−5 | −32 | −32 | −28 | −28 | −16 | −12 | −8 |
| =−4 | −24 | −20 | −16 | −12 | −12 | −12 | −4 |
| =−3 | −12 | −8 | −8 | −8 | −8 | −12 | −4 |
| =−2 | −12 | −4 | −4 | −8 | −4 | −4 | −4 |
| =−1 | −12 | −4 | −4 | −4 | 4 | 4 | 4 |
| =0 | −12 | −4 | −4 | 0 | 4 | 4 | 4 |
| =1 | −8 | −4 | 4 | 4 | 4 | 4 | 4 |
| =2 | −4 | −4 | 4 | 4 | 4 | 4 | 4 |
| =3 | −4 | −4 | 4 | 4 | 4 | 8 | 12 |
| =4 | 4 | 4 | 8 | 12 | 12 | 12 | 16 |
| ≥5 | 8 | 12 | 12 | 20 | 28 | 32 | 36 |

As an example, when the $\Delta T_{deviation} \leq -5$ and the $\Delta\Delta T_{deviation} \leq -3$, the electronic expansion valve 4 is reduced by 32 steps. When the $\Delta T_{deviation} \geq 5$ and the $\Delta\Delta T_{deviation} \geq 3$, the electronic expansion valve 4 is increased by 36 steps.

In the method disclosed by the present embodiment, the opening degree of the electronic expansion valve 4 is preferably adjusted based on those two factors: the deviation and the deviation change rate, hence for each time the steps of electronic expansion valve 4 could be increased or decreased on the basis of the previous opening degree otherwise the electronic expansion valve 4 requires returning to the initial opening degree repeatedly and then being adjusted. Hence, the method disclosed by the present embodiment is more convenient and stable.

During the operation of the air conditioner, it is also necessary to obtain the compressor frequency f. If f=0, the electronic expansion valve 4 is closed and the solenoid valve SV2 is closed.

Based on the method for controlling a heat dissipation structure of an air conditioner described above, another embodiment of the present invention provides a system for controlling a heat dissipation structure of an air conditioner. The system includes including a heat dissipation structure and a control system.

The heat dissipation structure includes a refrigerant heat dissipation pipe 2 and a heat dissipation substrate 1; wherein the heat generating component 3 is fixed to the heat dissipation substrate 1 and the refrigerant heat dissipation pipe 2 is embedded in the heat dissipation substrate 1; on a contact surface of the heat dissipation substrate 1 and the refrigerant heat dissipation pipe 2, a thermal medium is coated, and a thermal medium is also applied to a contact surface of the heat dissipation substrate 1 and the heat generating component 3. The inlet end of the refrigerant heat dissipation pipe 2 is connected to the liquid pipe between the outdoor heat exchanger and the indoor heat exchanger, and the outlet end of the refrigerant heat dissipation pipe 2 is connected to the liquid inlet pipe of the gas-liquid separator; the refrigerant heat dissipation pipe 2 is provided with an electronic expansion valve 4 and a solenoid valve SV2 connected with each other in series.

Figure 5:
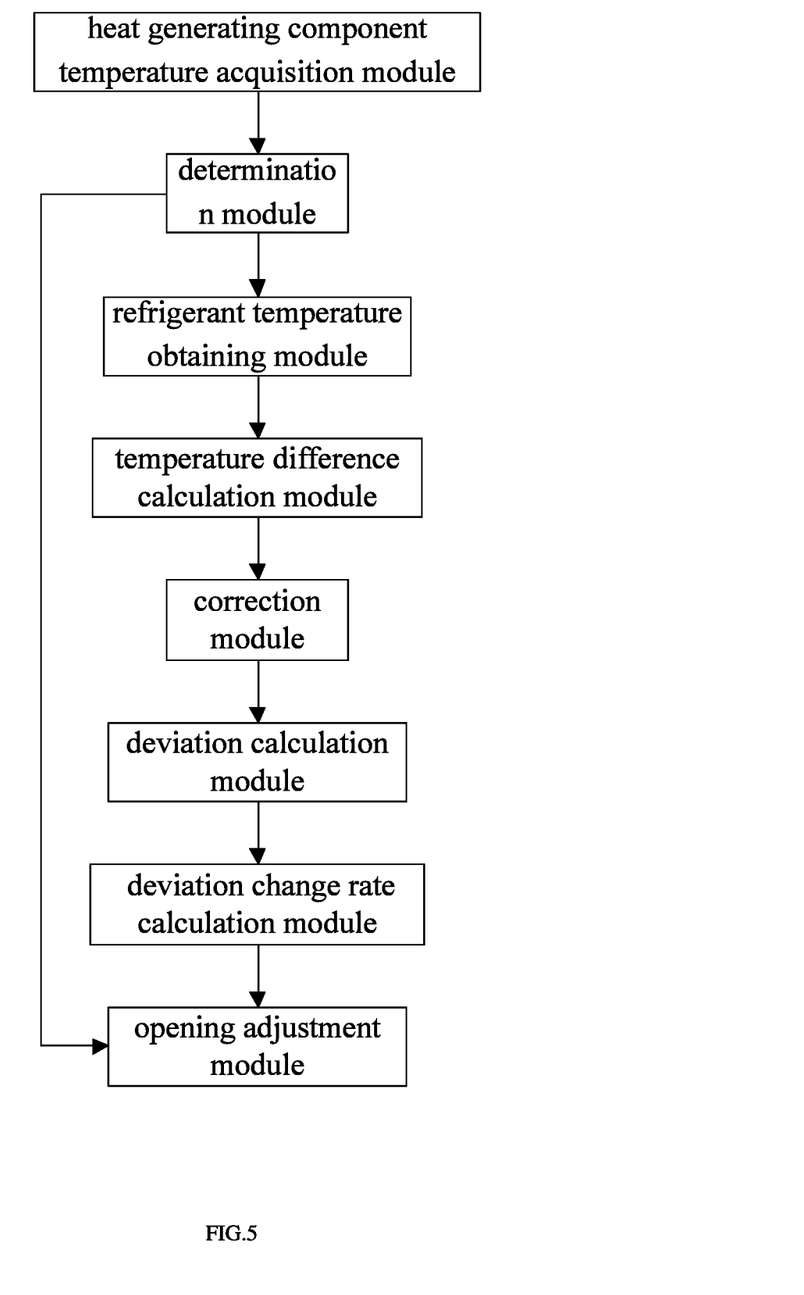
FIG. 5 is a block diagram showing a system for controlling a heat dissipation structure of an air conditioner according to an embodiment of the present invention.

The control system includes a heat generating component temperature acquisition module, a determination module, a refrigerant temperature acquisition module, a temperature difference calculation module, a correction module, a deviation calculation module, a deviation change rate calculation module and an opening adjustment module, as shown in FIG. 5.

The heat generating component temperature acquisition module is used to obtain the real-time temperature $T_e$ of the heat generating component.

The determining module is configured to determine whether the real-time temperature $T_e$>a preset optimal temperature $T_e^d$; and is also configured to determine whether the real-time temperature $T_e$>a preset upper limit value $T_{max}$; wherein $T_{max}$>$T_e^d$.

The refrigerant temperature obtaining module is configured to obtain a refrigerant temperature $T_{in}$ at an inlet end of the refrigerant heat dissipation pipe and a refrigerant temperature $T_{out}$ at the outlet end of the refrigerant heat dissipation pipe.

The temperature difference calculation module is used to calculate the temperature difference $\Delta T_{real-time}=T_{out}-T_{in}$.

The correction module is configured to determine a correction value according to the real-time temperature $T_e$ of the heat generating component and to correct the target temperature difference.

The deviation calculation module is used to calculate a deviation $\Delta T_{deviation}=\Delta T_{real-time}-\Delta T_{target}$.

The deviation change rate calculation module is configured to calculate a deviation change rate $\Delta\Delta T_{deviation}=\Delta T_{deviation}-\Delta T_{deviation'}$; wherein $\Delta T_{deviation'}$ is the deviation calculated last time.

The opening adjustment module is configured to adjust the opening of the electronic expansion valve to the initial opening degree, and is also configured to adjust the opening degree of the electronic expansion valve according to the deviation $\Delta T_{deviation}$ and the deviation change rate $\Delta\Delta T_{deviation}$.

The working process of the system for controlling a heat dissipation structure of an air conditioner could be referred to the method for controlling a heat dissipation structure of an air conditioner as described above.

The system for controlling a heat dissipation structure of an air conditioner disclosed by the present embodiment, which includes obtaining a real-time temperature Te of the heat generating component; if $T_e$>$T_e^d$, opening the solenoid valve SV2 and adjusting the electronic expansion valve 4 to a preset initial opening degree; obtaining an update real-time temperature $T_e$ of the heat generating component after a setting time period; if the update real-time temperature $T_e$>$T_{max}$, performing the following steps every set period of time, obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe; calculating a real-time temperature difference $\Delta T_{real-time}$ of the inlet end temperature $T_{in}$ and the outlet end temperature $T_{out}$, wherein $\Delta T_{real-time}=T_{out}-T_{in}$, obtaining a preset target temperature difference $\Delta T_{target}$ and calculating a deviation $\Delta T_{deviation}$, $\Delta T_{deviation}=\Delta T_{real-time}-\Delta T_{target}$, calculating a deviation change rate $\Delta\Delta T_{deviation}=\Delta T_{deviation}-\Delta T_{deviation'}$, and adjusting the opening degree of the electronic expansion valve based on the deviation $\Delta T_{deviation}$ and the deviation change rate $\Delta\Delta T_{deviation}$, enables the temperature difference between the inlet end and the outlet end of the refrigerant heat dissipation pipe reaches the target temperature difference so as to ensure a good heat dissipation effect and keep the heat generating component working in a good condition and also lowers the cost by using refrigerant for transferring heat from the heat generating component. With the method, the reliability and stability of the air conditioning operation are improved, and the problem of poor heat dissipation reliability and high heat dissipation cost in the prior art is solved.

The above embodiments are only used to illustrate the technical solutions of the present invention, and are not limited thereto; although the present invention has been described in detail with reference to the foregoing embodiments, those skilled in the art can still The technical solutions are described as being modified, or equivalents are replaced by some of the technical features; and such modifications or substitutions do not depart from the spirit and scope of the technical solutions claimed in the present invention.

What is claimed is:

1. A method for controlling a heat dissipation structure of an air conditioner wherein:
    the heat dissipation structure comprising:
    a refrigerant heat dissipation pipe with an inlet end connected to a liquid pipe between an outdoor heat exchanger and an indoor heat exchanger and an outlet end connected to an inlet pipe of the gas-liquid separator, which is fixed with a heat generating component; and
    an electronic expansion valve connected in series to the refrigerant heat dissipation pipe;
    the method comprises:
    obtaining a real-time temperature $T_e$ of the heat generating component;
    determining whether the real-time temperature $T_e$>a preset optimal temperature $T_e^d$;
    in responsive to $T_e>T_e^d$, adjusting the electronic expansion valve to a preset initial opening degree;
    obtaining an update real-time temperature $T_e$ of the heat generating component after a preset time period;
    determining whether or not the update real-time temperature $T_e$>a preset upper limit value $T_{max}$; wherein $T_{max}>T_e^d$;
    in responsive to the update real-time temperature $T_e>T_{max}$ performing following steps every set period of time:
        (1) obtaining a refrigerant temperature refrigerant temperature $T_{in}$ at the inlet end of the refrigerant heat dissipation pipe and a refrigerant temperature $T_{out}$ at the outlet end of the refrigerant heat dissipation pipe;
        (2) calculating a real-time temperature difference $\Delta T_{real-time}$ of the inlet end temperature $T_{in}$ and the outlet end temperature $T_{out}$, wherein $\Delta T_{real-time}=T_{out}-T_{in}$;
        (3) obtaining a preset target temperature difference $\Delta T_{target}$ and calculating a deviation $\Delta T_{deviation}$, $\Delta T_{deviation}=\Delta T_{real-time}-\Delta T_{target}$;
        (4) calculating a deviation change rate $\Delta\Delta T_{deviation}=\Delta T_{deviation}-\Delta T_{deviation'}$, wherein the $\Delta T_{deviation'}$ is the deviation calculated last time;
        (5) adjusting the opening degree of the electronic expansion valve based on the deviation $\Delta T_{deviation}$ and the deviation change rate $\Delta\Delta T_{deviation}$.

2. The method of claim 1, wherein in specific sub-steps in the Step (3) comprise:
    obtaining a correction value according to the current real-time temperature $T_e$ of the heat generating component after obtaining the preset target temperature difference $\Delta T_{target}$;
    correcting the preset target temperature difference $\Delta T_{target}$, wherein the corrected target temperature difference=the preset target temperature difference $\Delta T_{target}$+the correction value; and
    calculating a deviation $\Delta T_{deviation}$ based on the corrected target temperature difference,
    wherein $\Delta T_{deviation}=\Delta T_{real-time}-(\Delta T_{target}+$the correction value).

3. The method of claim 2, wherein the larger the real-time temperature $T_e$ of the heat generating component, the smaller the correction value;
    in responsive to $T_e\geq$a second set temperature, the correction value is <0;
    in responsive to a first set temperature$\leq T_e<$the second set temperature, the correction value=0;
    in responsive to $T_e<$the first set temperature, the correction value is >0.

4. The method of claim 3, wherein:
    when 90° C.$\leq T_e<$100° C., the correction value is −3° C.;
    when 80° C.$\leq T_e<$90° C., the correction value is −2° C.;
    when 70° C.$\leq T_e<$80° C., the correction value is −1° C.;
    when 60° C.$\leq T_e<$70° C., the correction value is 0;
    when 50° C.$\leq T_e<$60° C., the correction value is 1° C.;
    when 40° C.$\leq T_e<$50° C., the correction value is 2° C.

5. The method of claim 1, wherein adjusting the opening degree of the electronic expansion valve based on the deviation $\Delta T_{deviation}$ and the deviation change rate $\Delta\Delta T_{deviation}$ includes:
    (1) in responsive to the $\Delta T_{deviation}<0$ and the $\Delta\Delta T_{deviation}<0$, reducing the opening degree of the electronic expansion valve;
    (2) in responsive to the $\Delta T_{deviation}=0$ and the $\Delta\Delta T_{deviation}=0$, keeping the opening degree of the electronic expansion valve unchanged;
    (3) in responsive to the $\Delta T_{deviation}>0$, and the $\Delta\Delta T_{deviation}>0$, increasing the opening degree of the electronic expansion valve;
    (4) in responsive to the $\Delta T_{deviation}<0$ and the $\Delta\Delta T_{deviation}>0$,
        if $-2°$ C.$<\Delta T_{deviation}<0°$ C., increasing the opening degree of the electronic expansion valve;
        if $\Delta T_{deviation}\leq-2°$ C., reducing the opening degree of the electronic expansion valve;
    (5) when the $\Delta T_{deviation}>0$ and the $\Delta\Delta T_{deviation}$ is <0,
        in responsive to 0° C.$<\Delta T_{deviation}\leq3°$ C. and $\Delta\Delta T_{deviation}\leq-2°$ C., reducing the opening degree of the electronic expansion valve;
        in responsive to 0° C.$<\Delta T_{deviation}\leq3°$ C. and $-2°$ C.$<\Delta\Delta T_{deviation}<0°$ C., increasing the opening degree of the electronic expansion valve; and
        in responsive to the $\Delta T_{deviation}>3°$ C., increasing the opening degree of the electronic expansion valve.

6. The method of claim 1, wherein $T_{max}=T_e^d+5°$ C.

7. The method of claim 1, wherein the initial opening degree of the electronic expansion valve is in a range from 40% to 60% of a full opening degree.

8. The method of claim 1, wherein a solenoid valve SV2 is connected in series to the refrigerant heat dissipation pipe to close or open the refrigerant heat dissipation pipe.

9. The method of claim 1, wherein the refrigerant heat dissipation pipe is fixed to the heat generating component through a heat dissipation substrate, a thermal medium is coated on a contact surface between the heat dissipation substrate and the refrigerant heat dissipation pipe, and a thermal medium is also coated on a contact surface of the heat dissipation substrate and the heat generating component.

\* \* \* \* \*